Jan. 18, 1949.     L. F. ELKINS     2,459,268
BORE HOLE PRESSURE GAUGE
Filed April 24, 1944     2 Sheets-Sheet 1
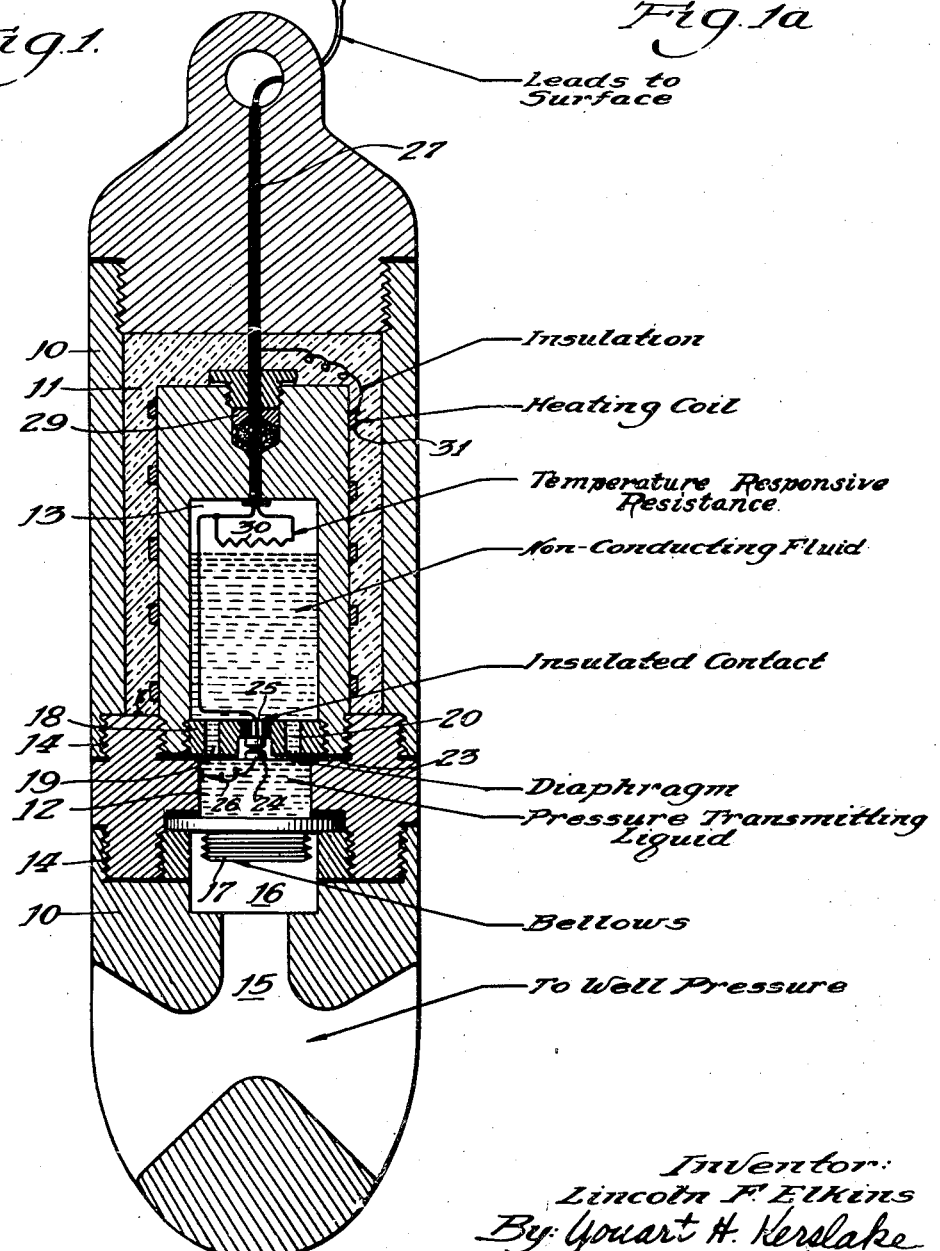

Jan. 18, 1949.    L. F. ELKINS    2,459,268
BORE HOLE PRESSURE GAUGE
Filed April 24, 1944    2 Sheets-Sheet 2
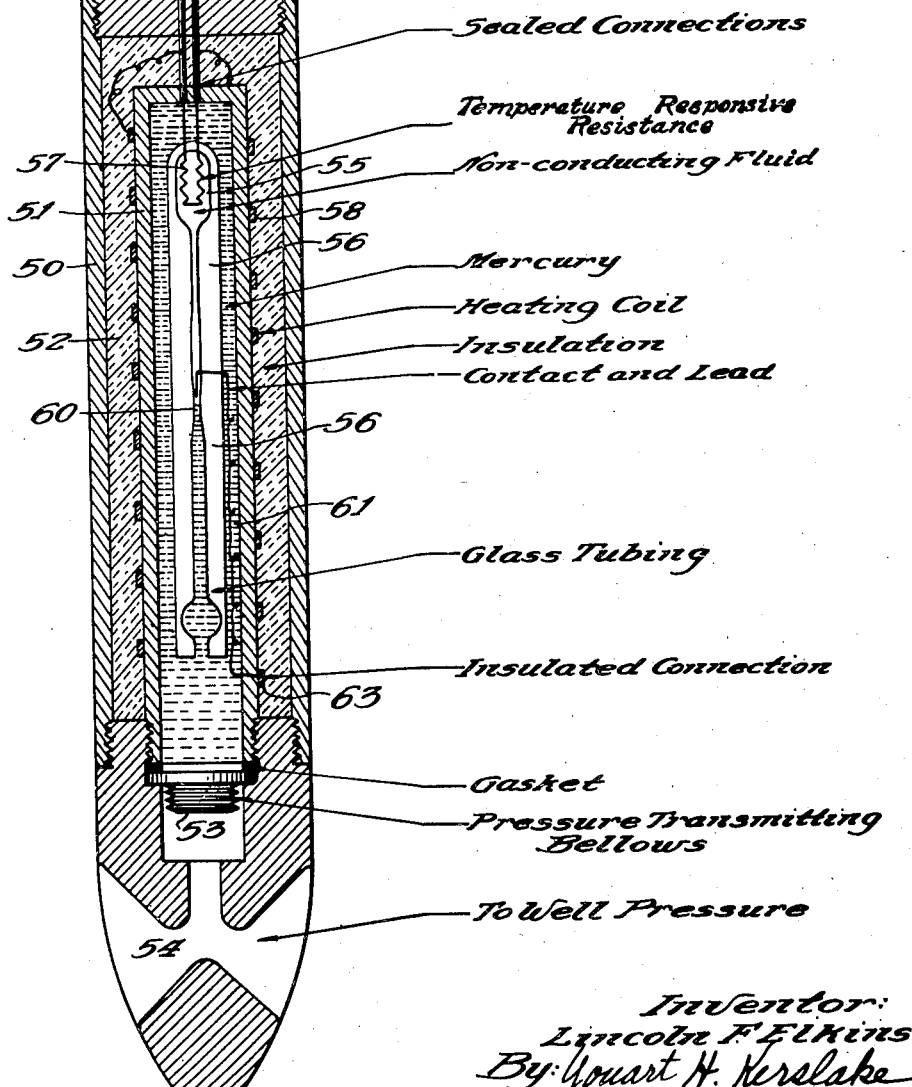

Patented Jan. 18, 1949

2,459,268

UNITED STATES PATENT OFFICE 2,459,268

BOREHOLE PRESSURE GAUGE

Lincoln F. Elkins, Tulsa, Okla., assignor to Stanolind Oil and Gas Company, Tulsa, Okla., a corporation of Delaware Application April 24, 1944, Serial No. 532,399

10 Claims. (Cl. 73—300)

The present invention relates to pressure gauges and more particularly to those pressure gauges which are suitable for determining the pressure within a bore hole.

Various types of pressure gauges for recording bore hole pressures are known. Most of these gauges are provided with a self-contained recording device which is lowered into the bore hole as a part of the pressure gauge. It is, therefore, necessary to remove the pressure gauge from the bore hole in order to determine what pressures exist therein. According to the present invention, however, a record of the pressures existing in the bore hole is made at the surface so that the operator can always determine the pressure within the bore hole without removing the gauge therefrom.

Broadly, my invention involves the step of heating a known quantity of a compressible or vaporizable fluid to create a pressure which will counterbalance the pressure in the bore hole. The pressure so created can be easily determined when the temperature of the fluid is known. The pressure gauge includes a temperature responsive resistance which is connected electrically to an indicating and/or recording device at the surface. The present invention enables one to determine accurately and conveniently the pressures encountered in a bore hole.

This invention will be more easily understood by referring to the drawings which form a part of the present specification and in which Figure 1 illustrates one form of pressure gauge according to the present invention, Figure 1a is an electrical diagram of the system used in the gauge shown in Figure 1.

Figure 2 illustrates a modified form of the gauge according to the present invention having the same electrical system as that shown in Figure 1a, and Figure 2a is an electrical diagram of a modification of the system shown in Figure 1a.

With reference to Figure 1, a housing 10 for enclosing the device is provided. Heat insulating material 11 is provided inside the housing 10. The pressure gauge device comprises two compartments 12 and 13 which are secured together. The lower compartment 12 is connected to the housing 10 by threaded connections 14. The lower part of the housing 10 is provided with a port 15 which communicates with the well bore and the chamber 16. A flexible metal bellows 17 is provided, one side of which is subject to the well pressures through port 15 and chamber 16 while the interior of said bellows forms a part of compartment 12 which is filled with a substantially non-compressible liquid such as oil or the like. The upper compartment 13 is provided at its lower end with a plug 18 having a plurality of pressure ports 19 and 20. The plug 18 is recessed at its center so that when the device is assembled a space is provided between the two compartments 12 and 13. A diaphragm 23 is provided within this space and is clamped between the two compartments around its outer edge. The center portion of the diaphragm is free to move when subjected to a pressure on its lower side which exceeds the pressure on the upper side. A contact 24 is provided attached to diaphragm 23 while the plug 18 is provided with a fixed contact 25 which is insulated therefrom. When the diaphragm 23 is subjected to well pressures through compartment 12, which pressures exceed the pressure in compartment 13, the diaphragm 23 will move upwardly so that contact 24 will make an electrical connection with contact 25. Contact 24 is grounded to the device by means of wire 26. The housing 10 is provided with means such as port 27 for the introduction of insulated leads 28 which pass through high pressure seal 29 into compartment 13. The leads are connected to a temperature responsive resistance 30 and also to heating element 31 and contacts 24 and 25.

Compartment 13 is provided with a known quantity of a compressible or vaporizable nonconducting fluid so that the pressure of said fluid upon the diaphragm 23 can be readily determined when the temperature of said fluid is known. This temperature may be readily determined by means of the temperature responsive resistance 30. Vaporizable fluids which may be used for this purpose are water, ether, alcohol, acetone, or any other fluid which is vaporizable and non-conducting, or compressible fluids such as air, or other normally gaseous substances, may be used if desired. It will be clear, therefore, that knowing the kind of fluid in compartment 13 as well as the quantity thereof, and also knowing the temperature thereof, the pressure may be determined very readily.

The device shown in Figure 1 operates in the following manner: The insulated leads 28 are connected to a source of electrical energy 33 and the device is lowered into a bore hole. As long as the well pressure is insufficient to raise the diaphragm 23 to establish electrical contact between 24 and 25, no current will flow through the heating element 31 and the fluid contained in insulated compartment 13 will remain at substantially normal temperature. The current which passes through the temperature responsive resistance 30 will not at this stage of the operation give an accurate indication of the well pressures, since the pressure in compartment 13 may, at the beginning of the operation, be substantially higher than the well pressure. The resistance of the temperature responsive resistance 30 is very large in comparison with the resistance of the heating element 31 and the insulated leads 28. However, when the pressure in the bore hole rises so that electrical contact will be established between contacts 24 and 25, current will pass through the heating element 31 and the fluid contained in compartment 13 will be heated so that the pressure thereof increases. As the fluid expands in compartment 13 and the pressure thereof rises, a point will be reached at which the pressure in compartment 13 will be sufficient to counterbalance the bore hole pressures against the lower side of diaphragm 23. At this time the diaphragm 23 will be depressed and the circuit through heating element 31 will be broken. The current which then passes through the circuit will decrease abruptly. Since this current now is only that which passes through the temperature responsive resistance element 30, it gives an indication of the temperature within compartment 13. As stated hereinbefore, the pressure of the fluid in compartment 13 may be easily calculated and since this pressure is equal to the pressure in the bore hole, the desired information will be known. The amount of current passing through temperature responsive resistance 30 may be easily determined by means of a simple ammeter 34 or the like which is placed in the circuit. Obviously the ammeter may be located at the surface where it is easily and readily visible to the operator. If desired, the ammeter may be calibrated in order to give the temperature directly or even the pressure of the fluid in compartment 13.

Figure 1a is an electrical diagram of the system used in the pressure gauge shown in Figure 1. The battery 33, ammeter 34, temperature responsive resistance 30, heating coil 31 and contacts 24 and 25 are the same elements as shown in Figure 1. The pressure gauge illustrated in Figure 2 and described hereinafter has an electrical system which is the same as that shown in Figure 1a.

According to the modification illustrated in Figure 2, a housing 50 containing compartment 51 is provided. Heat insulating material 52 is placed between the compartment 51 and the housing 50. The compartment 51 is provided with a pressure bellows 53 at the bottom thereof. The outside of the bellows 53 is in communication with bore hole pressure through port 54. A bulb-like element 55 which may be composed of glass or other like material is disposed within the compartment 51 and forms a second compartment. A tubular element 56 extends from the bottom of element 55 and is open at its lower end so that communication with compartment 51 is obtained. Compartment 51 and the lower end of tubular element 56 is filled with mercury while the bulb-like element 55 and the upper part of the tubular element 56 contains a compressible or vaporizable non-conducting fluid such as water, ether, alcohol, acetone, or the like. In this modification, it is necsesary that the compressible fluid be immiscible with the mercury. Although mercury has been specified as the material filling compartment 51, it will be understood that any other non-compressible liquid which is electrically conductive and which will not vaporize at the temperatures involved, will be suitable for the purpose of this invention. A temperature responsive resistance 57 is provided within the bulb-like element 55. A heating coil 58 is provided around the compartment 51 and is electrically connected to insulated leads 59. Temperature responsive resistance 57 is also connected to leads 59. Intermediate the tubular element 56 a contricted zone 60 is provided and electrical conductor 61 is provided at this point to provide a thermostatic control for the heating element 58. Whenever the mercury rises within the tubular element 56 so as to make contact with lead 61, the circuit including the heating element 58 will be closed and the heating element will heat the compressible fluid in bulb-like element 55. Lead 61 which is insulated from the mercury or similar liquid within compartment 51 is connected to the end of heating coil 58. A source of electrical energy 62 and an ammeter 65 is included in the circuit.

According to this modification, the device operates in substantially the same manner as the device illustrated in Figure 1. Insulated leads 59 are connected to the source of electric energy 62 and the pressure gauge lowered into a bore hole. When the pressure within the bore hole rises so that the mercury within the tubular element 56 will rise and contact lead 61, the heating coil circuit will be closed so that compartment 51 and bulb-like element 55, forming the second compartment will be heated. As the compressible fluid in compartment 55 expands and the pressure thereof increases, a point will be reached at which the bore hole pressure on the mercury will be counterbalanced and the electrical contact between lead 61 and the mercury will be broken. At this moment the amount of current passing through temperature responsive resistance 57 will indicate by means of ammeter 65 or the like the temperature of the fluid and therefore the pressure thereof, as indicated hereinbefore.

It will be clear from the device shown in Figures 1 and 2 that the amount of current passing through the temperature responsive resistances 30 or 57 cannot be determined while the heating elements 31 or 58 are in the closed circuit, since the current flowing through the ammeter 34 or 65 will be a summation of the current passing both through the temperature responsive resistance 30 or 57 as well as the current passing through the heating element 31 or 58 respectively. If desired, the temperature responsive resistances 30 and 57 may be connected to a separate circuit which is independent of the heating coil circuit, but since the temperature of the compressible fluid and consequently the pressure thereof during the heating step is of little or no value, the arrangements shown in the drawings are preferred. If desired, one of the pair of leads 28 or 59 may be eliminated. This may be accomplished by using an electrical system as illustrated in Figure 2a in which the battery 62 (Figure 2) is grounded at 66 and the lead from the temperature responsive resistance 57 and the heating element 58 is grounded at 67. This may be done by connecting one of the leads 59 to the housing 50. The system involving the use of a single lead to the top of the bore hole may be used advantageously when the pressure gauge can be electrically grounded to the earth surrounding the bore hole. Although the electrical connection through the earth may be subject to slightly variable resistance, such a system will give highly satisfactory results. Obviously if the pressure gauge is electrically insulated from the surrounding earth as would be the case if the bore whole contained only oil, it would then be necessary to use a pair of leads as shown in Figure 1 and 2.

Although my invention has been described with particular reference to two modifications, it is to be understood that I do not wish to be limited to the exact arrangement and construction as shown in the figures. Various alterations and modifications of the devices will undoubtedly occur to those skilled in the art and such modifications are intended to be included within the scope of the present invention.

Having now described my invention and the method of operation thereof, what I claim is:

1. A pressure gauge for use in bore holes comprising a housing adapted to be lowered into a bore hole and having a first compartment containing a non-compressible liquid and a second compartment containing a known quantity of a compressible fluid, means for subjecting the liquid in said first compartment to the pressure existing in said bore hole, means for heating the fluid in said second compartment to increase the pressure thereof, a diaphragm disposed between said compartments, said diaphragm being responsive to difference between the pressures in said compartments, means actuated by said diaphragm for controlling said heating means, a source of electric energy, a temperature responsive resistance located within said second compartment and connected to said source of electric energy, and means responsive to said temperature responsive resistance for indicating the temperature of the fluid within said second compartment whereby the pressure of the fluid may be determined.

2. A pressure gauge for use in bore holes comprising a housing adapted to be lowered into a bore hole having a compartment therein, a tubular bulb-like element disposed within said compartment, said element communicating with said compartment at its lower end, said compartment and the lower end of said tubular element containing a non-compressible electrically conductive liquid, the upper portion of said tubular element forming the second compartment containing a known quantity of a compressible fluid, said fluid being immiscible with said liquid, means for subjecting the liquid in said first compartment to the pressure existing in said bore hole, an electric temperature responsive resistance disposed within the upper portion of said tubular element, an electric switch disposed within the lower end of said tubular element, said switch being closed by the noncompressible electrically conductive liquid when the bore hole pressure exceeds the pressure of the compressible fluid, and an electric heating element surrounding said compartments, said heating element being controlled by said switch, means responsive to said temperature responsive resistance for indicating the temperature of said fluid whereby the pressure of said fluid may be determined.

3. Pressure measuring mechanism comprising in combination, a sealed cell having a stationary and a movable wall; coacting means carried by said walls; means for heating said cell, controlled by said coacting means; and means for measuring the temperature within said cell.

4. Pressure measuring mechanism comprising in combination, a sealed cell having a stationary and a movable wall; coacting contact means carried by said walls; resistance means for heating said cell, said resistance means having a circuit containing a source of current; movement of the movable wall of said cell causing engagement and disengagement of said contact to control the operation of said heating means; and means for measuring the temperature within said cell.

5. Pressure measuring mechanism comprising in combination, a cell having a stationary wall and bellows means hermetically joined thereto; fluid means disposed in said cell, said fluid being expansible under the influence of heat; a contact carried by said stationary wall; a complemental contact mounted on said bellows means, said contact engaging and separating in response to movement of said bellows; electrical heating means adjacent said cell, said heating means having a circuit including a source of electrical energy and said contacts; and means for measuring the temperature within said cell.

6. Pressure measuring mechanism comprising in combination, a cell having a stationary wall and bellows means hermetically joined thereto; fluid means disposed in said cell, said fluid being expansible under the influence of heat; a contact carried by said stationary wall; a complemental contact mounted on said bellows means, said contacts engaging and separating in response to movement of said bellows; electrical heating means adjacent said cell, said heating means having a circuit including a source of electrical energy and said contacts; means in said cell affected by temperature changes therein; and means disposed remotely from said cell for measuring the effect of the temperature changes on said means within said cell.

7. Pressure measuring apparatus comprising, in combination, an expansible cell; means for varying the temperature within said cell to tend to change a dimension thereof; means responsive to the change in dimension of said cell for controlling said temperature varying means; and means for measuring the temperature within said cell.

8. Pressure measuring apparatus comprising, in combination, an expansible cell; means for varying the temperature within said cell to cause a portion thereof to move; means responsive to the movement of said cell to control the operation of said temperature varying means; and means for indicating the temperature wthin said cell at a remote location.

9. A pressure gauge for use in bore holes comprising a housing adapted to be lowered into a bore hole, a first quantity of a non-compressible liquid and a second quantity of a compressible fluid within said housing, bellows means on said housing for exerting the pressure existing within said bore hole on said liquid and causing the level of said liquid to deviate from a predetermined datum, means for heating the said fluid to a predetermined volume thereby restoring the level of the non-compressible liquid which had been displaced by reason of the pressure exerted on the liquid, heat control means adapted to be actuated in response to changes in the pressure differential between said liquid and fluid, a temperature responsive means responsive to variations in the temperature of the fluid, and indicating means actuated by said temperature responsive means for indicating the temperature of said fluid whereby the pressure of the fluid may be determined.

10. A pressure gauge which comprises a fluid-tight chamber provided with a compartment containing a fluid at least a part of which is in gasiform state and also containing a compartment substantially filled with liquid, a diaphragm for dividing the said chamber into said compartments, a movable wall forming a part of said chamber and positioned to transmit external pressure to said liquid, a circuit including a temperature responsive element thermally associated with said fluid, an indicator outside of said chamber and heating means for raising the temperature of the fluid whereby its pressure and volume are increased to balance the pressure transmitted by said liquid, said heating means including a source of electrical energy, a heating element thermally associated with said fluid, electrical connections between said heating element and said energy source, and electrical contacts for opening and closing the circuit in accordance with the position of the liquid in the chamber, the first of said electrical contacts being mounted on said diaphragm for movement therewith, and another of said electrical contacts being fixedly mounted in the chamber above said diaphragm.

LINCOLN F. ELKINS.

REFERENCES CITED

The following references are of record in the file of this patent:

UNITED STATES PATENTS

| Number | Name | Date |
|---|---|---|
| 410,786 | Cooper et al. | Sept. 10, 1889 |
| 576,208 | Lozier | Feb. 2, 1897 |
| 1,233,522 | Stevens | July 17, 1917 |
| 2,190,260 | Ennis | Feb. 13, 1940 |
| 2,342,587 | Klemperer | Feb. 22, 1944 |
| 2,388,542 | Hobbs | Nov. 6, 1945 |

FOREIGN PATENTS

| Number | Country | Date |
|---|---|---|
| 269,480 | Germany | Jan. 21, 1914 |
| 519,083 | Great Britain | Mar. 15, 1940 |

OTHER REFERENCES

Pages 123 and 124 of the Transactions of the American Institute of Mining and Metallurgical Engineers, Petroleum Development and Technology, 1928–1929, published by the Institute at the office of the Secretary, 29 West 39th St., N. Y. N. Y., 1929. (A copy of this publication may be found in Div. 32.)